United States Patent Office 3,395,146
Patented July 30, 1968

3,395,146
4-SUBSTITUTED-2-BENZHYDRYL-2-BUTANOL
DERIVATIVES
Gerhard Satzinger, Memmingerberg, Allgau, Germany,
assignor to Warner-Lambert Pharmaceutical Company,
Morris Plains, N.J., a corporation of Delaware
No Drawing. Filed Feb. 11, 1965, Ser. No. 463,059
16 Claims. (Cl. 260—247.2)

ABSTRACT OF THE DISCLOSURE

The invention discloses a new class of 4-substituted-2-benzhydryl-2-butanol derivatives of the formula:

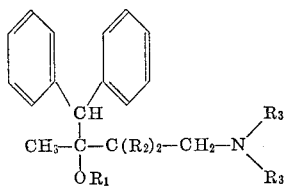

wherein $R_1$, $R_2$ and $R_3$ are, respectively, hydrogen or lower alkyanoyl; hydrogen or lower alkyl; hydrogen, lower alkyl, cycloalkyl of 3 to 8 carbon atoms and, when taken together with the nitrogen, the $R_3$'s form piperidino, morpholino or piperazino. These compounds are useful as antitussive agents.

---

This invention relates to certain new and novel 4-substituted-2-benzhydryl-2 - butanol derivatives. More particularly, the present invention relates to 4-substituted-2-benzhydryl-2-butanol derivatives having the formula:

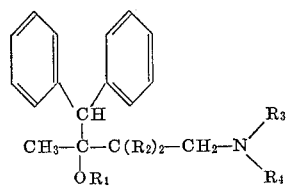

wherein $R_1$ is hydrogen or an acyl radical, $R_2$ is hydrogen or lower alkyl, and $R_3$ and $R_4$ are either the same or different memebrs of the group consisting of hydrogen, lower alkyl and cycloalkyl or when taken with the amino nitrogen atom form a closed chain heterocyclic group; and the nontoxic pharmaceutically acceptable acid addition salts thereof. The present invention also relates to a method for preparing these 4-substituted-2-benzhydryl - 2 - butanol derivatives.

In accordance with the present invention, it has now been found that new and novel 4-substituted-2-benzhydryl-2-butanol derivatives having useful pharmaceutical properties may be prepared without having many objectionable properties which characterize similarly useful compounds known heretofore.

It is, therefore, an object of this invention to provide a series of synthetic compounds which are physiologically-active and which are not generally subject to objectionable properties under physiological conditions which frequently characterize other known, similarly useful compounds.

It is a further object of this invention to provide new compounds having useful therapeutic applications without major side-effects or high toxicity.

It is another object of this invention to provide a method of preparing 4-substituted-2-benzhydryl-2-butanol derivatives having useful pharmaceutical activity.

Further objects and advantages will become more apparent from the accompanying disclosure.

In preparing compounds of the present invention, benzhydryl halide may first be reacted with lithium at 10° C.

in absolute tetrahydrofuran reaction solvent according to the following reaction scheme:

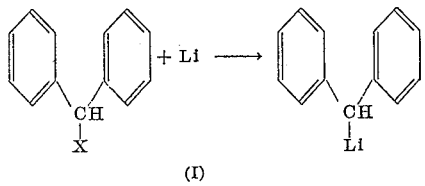

(I)

wherein X is a halogen radical such as chloro or bromo, to form benzhydryl lithium. Although this reaction is desirably conducted at a temperature of about 10° C., reasonable departures from this temperature may be made without adversely affecting the reaction. Other suitable reaction solvents which may also be employed in place of tetrahydrofuran include dimethyl sulfoxide and dimethyl formamide.

Proceeding, the formed benzhydryl lithium may next be reacted with 4-dialkylamino-2-benzhydryl-2-butanone at low temperatures, desirably less than 10° C., according to the following reaction scheme:

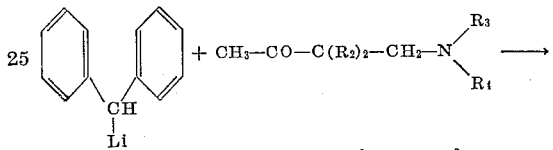

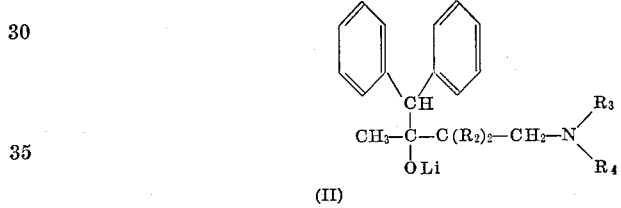

(II)

to form the corresponding lithium alcoholates.

The product of the proceeding reaction may then be processed by hydrolysis or by reaction with the corresponding aliphatic acid anhydrides as follows:

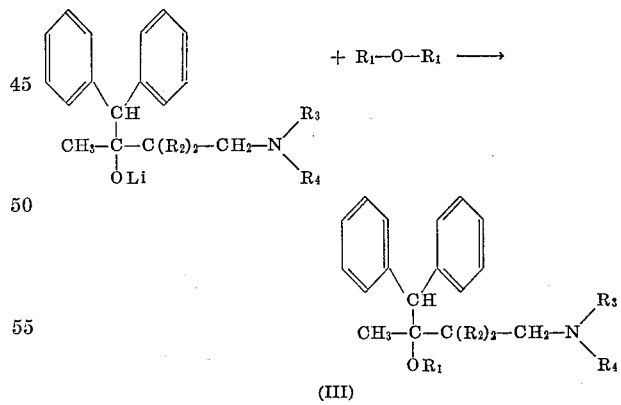

(III)

to prepare the desired product.

In order to illustrate the invention in greater detail, the following examples are given:

Example 1.—4-morpholino-2-benzhydryl-2-butanol.HCl 14 gms. of lithium (2 mols) is sliced up in 1 liter absolute tetrahydrofuran (THF) under dry oxygen-free nitrogen. A solution of 101.3 gms. (0.5 mol) benzhydryl chloride in 100 ml. absolute tetrahydrofuran is added dropwise with stirring and the inside temperature of the system is kept at about 10° C. by occasional cooling. The batch is then stirred for 20 hours at room temperature, whereby care is taken to maintain the nitrogen-atmosphere in the flask. The dark red benzhydryl lithium solution is pressed through glass wool by means of excess nitrogen pressure and is transferred into a second reaction flask flushed with nitrogen. Meanwhile, fresh 4-morpholino-2-butanone is prepared by addition of morpholine to methyl-vinyl ketone in ether at 0° C. which is followed by distillation (B.P.$_{20}$ 116° C.). 59.6 gms. (0.4 mol) of 4-morpholino-2-butanone is added by drops at 0 to 5° C. to the benzhydryl lithium solution in tetrahydrofuran with active stirring. After this addition, stirring is continued for 2 additional hours at room temperature and the tetrahydrofuran is then vacuum distilled. The residue which results is treated with 2 N HCl and the acid phase is extracted with ether. After separation of the ether, the aqueous phase is made alkaline and the separated product is then taken up in benzene. The benzene is removed and the residue is distilled at 0.4 mm./180–200° C. The recovered substance is found to melt at 110° C. after recrystallization from benzene/petroleum ether. Yield: 55 gms.

*Analysis.*—Calcd: C, 77.49; H, 8.36; N, 4.31; O, 9.84. Found: C, 77.71; H, 8.14; N, 4.20; O, 9.67.

The hydrochloride salt of the product is obtained by saturating a concentrated solution of the base in isopropanol with gaseous HCl followed by careful treating with ether. Melting point: 210° C.

Example 2.—4-morpholino-2-benzhydryl-2-butanol acetate.HCl 59.6 gms. (0.4 mol) of 4-morpholino-2-butanone is reacted with benzhydryl lithium as described in Example 1. After distilling off the tetrahydrofuran in a vacuum, the residue is dissolved in a mixture of 50 ml. pyridine and 50 ml. acetic anhydride after which the system is heated for 6 hours under reflux. Evaporation in a vacuum to dryness then takes place, and the residue is ground with isopropanol until crystallization occurs. The product recovered after recrystallization from isopropanol and from ethyl acetate is found to melt at 147–148° C. Yield: 17 gms.

*Analysis.*—Calcd: C, 75.17; H, 7.96; N, 3.86, O, 13.05. Found: C, 75.05; H, 7.96; N, 3.68; O, 12.88.

The hydrochloride salt, prepared as described in Example 1, is found to have a melting point of 182° C.

Example 3.—4-dimethylamino-2-benzhydryl-2-butanol.HCl 4-dimethylamino-2-butanone having a B.P.$_{10}$ 44° C. is prepared by a procedure similar to that given in Example 1. 46.0 gms. (0.4 mol) of 4-dimethylamino-2-butanone is then reacted with benzhydryl lithium according to the procedure of Example 1. The prepared product is found to have a freezing point of 87° C. Yield: 30 gms.

*Analysis.*—Calcd: C, 80.52; H, 8.89; N, 4.94; O, 5.65. Found: C, 80.74; H, 8.70; N, 4.95; O, 5.63.

The prepared hydrochloride salt is found to have a melting point of 173° C.

Example 4.—4-dimethylamino-2-benzhydryl-2-butanol acetate.HCl 46.0 gms. (0.4 mol) of 4-dimethylamino-2-butanone is treated with benzhydryl lithium as indicated in Example 1. After distilling off the tetrahydrofuran by vacuum, the residue is dissolved in a mixture of 50 ml. pyridine and 50 ml. acetic anhydride and thereafter heated for 6 hours under reflux. Upon evaporation to dryness which takes place in vacuum, the residue is dissolved in ether, and the hydrochloride is precipitated with gaseous HCl. After decantation from the oily product and grinding with isopropanol, a product is recovered by crystallization. After recrystallization from isopropanol, the recovered product is found to melt at 194–195° C. Yield: 30 gms.

*Analysis.*—Calcd: C, 69.69; H, 7.80; N, 3.87; Cl 9.79. Found: C, 69.65; H, 7.87; N, 3.99; Cl 9.51.

Example 5.—4-diethylamino-2-benzhydryl-2-butanol tartrate 4-diethylamino-2-butanone having a B.P.$_{13}$ of 70° C. is prepared by a process similar to that given in Example 1. 57.2 gms. (0.4 mol) of 4-diethylamino-2-butanone is then treated with benzhydryl lithium according to the procedure of Example 1. The recovered product is found to have a B.P.$_{0.6}$ of 160–180°. The distillate, taken up in methanol is next treated hot with a methanolic tartaric acid solution. On cooling, the tartrate is separated out and is recrystallized from methanol. Melting point 172° C. Yield: 20 gms.

*Analysis.*—Calcd: C, 65.05; H, 7.65; N, 3.04; O, 24.26. Found: C, 65.22; H, 7.33; N, 3.24; O, 24.29.

Example 6.—4-piperidino-2-benzhydryl-2-butanol.HCl 4-piperidino-2-butanone having a B.P.$_{40}$ of 122° C. is prepared similarly to the process given in Example 1. 62.0 gms. (0.4 mol) of 4-piperidino-2-butanone is then treated with benzhydryl lithium according to the procedure of Example 1. The recovered product is found to have a B.P.$_{0.4}$ of 190–200° C. The product, recrystallized from petroleum ether, is found to have a melting point of 78–80° C. Yield: 18 gms.

*Analysis.*—Calcd: C, 81.70; H, 9.04; N, 4.33. Found: C, 82.03; H, 8.86; N, 4.35.

The melting point of the hydrochloride salt prepared according to the procedure of Example 1 is found to have a melting point of 190–191° C.

Example 7.—4-(4-methyl-1-piperazinyl)-2-benzhydryl-2-butanol·2HCl 4-(4-methyl-1-piperazinyl)-2-butanone having a B.P.$_{10}$ of 108–110° C. is prepared similarly to the process of Example 1. 68 gms. (0.4 mol) of 4-(4-methyl-1-piperazinyl)-2-butanone is then treated with benzhydryl lithium according to the procedure of Example 1. The recovered product is found to have a B.P.$_{0.2}$ of 212° C. The distillate is taken up in ether and the dihydrochloride is precipitated out with HCl gas. After recrystallization from isopropanol, the product is found to melt at 230–234° C. with decomposition. Yield: 20 gms.

*Analysis.*—Calcd: C, 64.22; H, 7.84; N, 6.82; Cl. 17.23. Found: C, 64.38; H, 7.65; N, 6.80; Cl, 16.80.

Example 8.—4-(cyclohexylmethylamino)-2-benzhydryl-2-butanol·HCl 4-(cyclohexylmethylamino)-2-butanone having a B.P.$_{12}$ of 114–117° C. is prepared in accordance with the procedure of Example 1. 68.8 gms. (0.4 mol) of 4-(cyclohexylmethylamino)-2-butanone is then reacted with benzhydryl lithium according to the procedure of Example 1. The recovered product is found to have a B.P.$_{0.8}$ of 230–233° C. The product on grinding with ethyl acetate becomes crystalline. After recrystallization, the recovered product is found to melt at 77–78° C. Yield: 28 gms.

*Analysis.*—Calcd: C, 82.00; H, 9.46; N, 3.99; O, 4.55. Found: C, 82.20; H, 9.48; N, 4.14; O, 4.43.

The hydrochloride compound is prepared by dissolving the recovered base in ether and introducing HCl gas. Upon recrystallization from isopropanol, the recovered hydrochloride compound is found to have a B.P. of 155–156° C.

The term "lower alkyl" as used in the specification and in the claims refers to members having branched and straight chain aliphatic groups and containing from 1 to 6 carbon atoms in the group, while the term "cycloalkyl" refers to groups having from 3 to 8 carbon atoms. The term "heterocyclic" represents radicals such as piperidyl, morpholinyl, and piperazinyl, and the term "acyl" includes groups such as acetyl, propionyl, butyryl, valeryl, and caproyl.

The 4-substituted-2-benzhydryl-2-butanol derivatives of this invention have interesting pharmacological activity and are useful as anti-tussive agents. In use these compounds may be formulated with conventional pharmaceutical carriers to form such typical dosage units as tablets, capsules, solutions, suspensions, suppositories and the like. It has been found that compounds of this invention may be also administered by injection with no apparent damage resulting to tissue. The hydrochloride salt of the present compound is found to be particularly useful in this regard primarily for the ease of solubility, as is the tartrate salt. Other salts may be prepared and proved to be equally useful.

It is to be understood that the foregoing detailed description is given merely by way of illustration and that many variations may be made therein without departing from the spirit of this invention.

What is claimed is:

1. A compound of the formula:

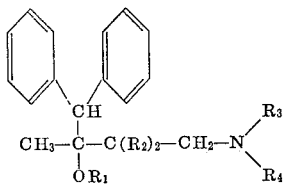

wherein $R_1$ is a member selected from the group consisting of hydrogen, acyl of lower alkanoyl acid of 2 to 6 carbon atoms, and cycloalkyl of 3 to 8 carbon atoms; $R_2$ is a member selected from the group consisting of hydrogen and lower alkyl; $R_3$ and $R_4$ are selected from the group consisting of hydrogen, lower alkyl, cycloalkyl of 3 to 8 carbon atoms and, when taken with the amino nitrogen atom, form a member selected from the group consisting of piperidino, morpholino, and piperazino; and the non-toxic pharmaceutically acceptable acid addition salts thereof.

2. 4-morpholino-2-benzhydryl-2-butanol.
3. 4-morpholino-2-benzhydryl-2-butanol hydrochloride.
4. 4-morpholino-2-benzhydryl-2-butanol acetate.
5. 4-morpholino-2-benzhydryl-2-butanol acetate hydrochloride.
6. 4-dimethylamino-2-benzhydryl-2-butanol.
7. 4-dimethylamino-2-benzhydryl-2-butanol hydrochloride.
8. 4-dimethylamino-2-benzhydryl-2-butanol acetate.
9. 4-dimethylamino-2-benzhydryl-2-butanol acetate hydrochloride.
10. 4-diethylamino-2-benzhydryl-2-butanol.
11. 4-diethylamino-2-benzhydryl-2-butanol tartrate.
12. 4-piperidino-2-benzhydryl-2-butanol.
13. 4-piperidino-2-benzhydryl-2-butanol hydrochloride.
14. 4 - (4 - methyl - 1 - piperazinyl) - 2 - benzhydryl-2-butanol-2-hydrochloride.
15. 4-(cyclohexylmethylamino)-2-benzhydryl - 2 - butanol.
16. 4 - (cyclohexylmethylamino) - 2 - benzhydryl - 2-butanol hydrochloride.

References Cited

UNITED STATES PATENTS

| | | | |
|---|---|---|---|
| 1,915,334 | 6/1933 | Salzberg et al. | 260—243 |
| 2,075,359 | 3/1937 | Salzberg et al. | 167—22 |
| 3,075,014 | 1/1963 | Palopoli et al. | 260—570 |

NICHOLAS S. RIZZO, *Primary Examiner.*

JOSE TOVAR, *Assistant Examiner.*